US012681457B2

(12) United States Patent
Adamski et al.

(10) Patent No.: US 12,681,457 B2
(45) Date of Patent: Jul. 14, 2026

(54) ASSEMBLY CONTROL WITH AUTHENTICATION OF CONTROL SYSTEM

(71) Applicant: RTX CORPORATION, Farmington, CT (US)

(72) Inventors: Paul A. Adamski, Westfield, MA (US); Anteneh B. Abrham, East Granby, CT (US); Alison K Adamski, Westfield, MA (US); Jason Dejesus, Norwalk, CT (US)

(73) Assignee: RTX Corporation, Farmington, CT (US)

( * ) Notice: Subject to any disclaimer, the term of this patent is extended or adjusted under 35 U.S.C. 154(b) by 368 days.

(21) Appl. No.: 18/468,347

(22) Filed: Sep. 15, 2023

(65) Prior Publication Data

US 2025/0093849 A1     Mar. 20, 2025

(51) Int. Cl.
*G05B 19/4155* (2006.01)

(52) U.S. Cl.
CPC .................... *G05B 19/4155* (2013.01); *G05B 2219/31044* (2013.01)

(58) Field of Classification Search
None
See application file for complete search history.

(56) References Cited

U.S. PATENT DOCUMENTS

| | | | | |
|---|---|---|---|---|
| 8,683,266 B2 * | 3/2014 | Migliasso | ............. | G06F 11/008 |
| | | | | 714/48 |
| 8,959,362 B2 | 2/2015 | Pettigrew et al. | | |

| | | | |
|---|---|---|---|
| 9,904,785 B2 | 2/2018 | Chand et al. | |
| 10,708,073 B2 | 7/2020 | Profumo et al. | |
| 11,470,062 B2 | 10/2022 | Rajagopalan et al. | |
| 11,601,304 B2 | 3/2023 | Costello et al. | |
| 11,625,459 B2 | 4/2023 | Rajagopalan et al. | |
| 2012/0295592 A1 * | 11/2012 | Peirce ................... | G07C 5/085 |
| | | | 455/414.1 |
| 2018/0093762 A1 | 4/2018 | Shue et al. | |
| 2021/0058460 A1 | 2/2021 | Schlichtner | |
| 2021/0097185 A1 | 4/2021 | Gilton et al. | |

OTHER PUBLICATIONS

Sliman, L., Biennier, F., Badr, Y. (2009). A security policy framework for context-aware and user preferences in e-services. Journal of Systems Architecture, vol. 55, No. 4, Apr. 1, 2009. pp. 275-288.
European Search Report for EP Application No. 24200408.3 dated Feb. 10, 2025.

* cited by examiner

*Primary Examiner* — Ryan A Jarrett

(74) *Attorney, Agent, or Firm* — Carlson, Gaskey & Olds, P.C.

(57) ABSTRACT

An embedded processing system includes processing circuitry, a memory system, and a plurality of attached modular components. The attached modular components are each provided with a nameplate including at least part and serial number data. The processing circuitry is operable to receive the nameplate information from each of the attached modular components and compare the received nameplate information with stored nameplate information for the particular attached modular component. The processing circuitry is operable to communicate with the attached modular component if the received nameplate information matches the stored nameplate information and identify a fault if the received nameplate information conflicts with the stored nameplate information. A method and an assembly are also disclosed.

20 Claims, 5 Drawing Sheets

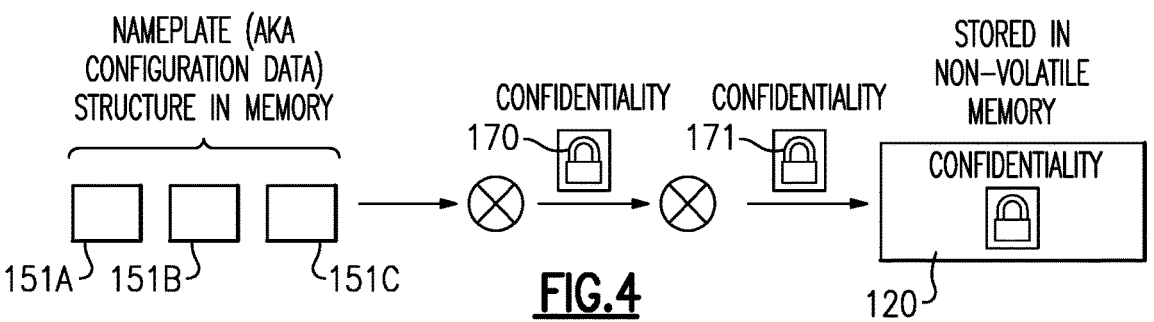

NAMEPLATE (AKA CONFIGURATION DATA) STRUCTURE IN MEMORY

CONFIDENTIALITY 170

CONFIDENTIALITY 171

STORED IN NON-VOLATILE MEMORY

CONFIDENTIALITY 151A  151B  151C

RECEIVE NAMEPLATE AKA CONFIGURATION DATA FROM EACH MODULE AT INITILIZATION OR RT ⟶172

AUTHENTICATE MODULE NAMEPLATE AKA CONFIGURATION DATA ⟶174

178⟶ FDA UTILIZE ENROLLMENT DATA TO COMPLETE RECONFIGURATION

N

DOES MODULE DATA MATCH CONFIGURATION ? ⟶176

Y

REPORT CONFIGURATION DATA TO SUPPORT SUPPLY CHAIN RISK MANAGEMENT (SCRM) INTENT REPORT STATUS/ INFORMATION ⟶180

GENERATE CRYPTOGRAPHIC SYSTEM KEYS WITH PW UNIQUE CRYPTOGRAPHIC INFORMATION ⟶182

FIG.5

ASSEMBLY CONTROL WITH AUTHENTICATION OF CONTROL SYSTEM

BACKGROUND OF THE INVENTION

This application relates to a control for an assembly that utilizes modules and/or nodes, and wherein there is an authentication process.

Modern assemblies are being provided with more and more complex controls. One example is an aircraft having gas turbine engines. A main control for the gas turbine engine is known as a full authority digital electronic controller ("FADEC"). FADEC's have historically been a complete control that was not subject to easy modification.

However, more recently, the controls are becoming modular. In a modular control, modules can be included to provide execution or feedback on specific functions. Moreover, nodes may communicate from outside into the control, and also are provided with function.

SUMMARY OF THE INVENTION

In a featured embodiment, an embedded processing system includes processing circuitry, a memory system, and a plurality of attached modular components. The attached modular components are each provided with a nameplate including at least part and serial number data. The processing circuitry is operable to receive the nameplate information from each of the attached modular components and compare the received nameplate information with stored nameplate information for the particular attached modular component. The processing circuitry is operable to communicate with the attached modular component if the received nameplate information matches the stored nameplate information and identify a fault if the received nameplate information conflicts with the stored nameplate information.

In another embodiment according to the previous embodiment, the nameplate information is encrypted.

In another embodiment according to any of the previous embodiments, the attached modular components include modules within the embedded processing system communicating outwardly to effectors on a controlled system, and receive sensed values from sensors associated with the controlled system.

In another embodiment according to any of the previous embodiments, the attached components also include nodes being control systems for auxiliary devices on the controlled system, and the nodes communicate into the embedded processing system, but are located outwardly of the embedded processing system.

In another embodiment according to any of the previous embodiments, at least one of the attached modular components is manufactured by a supplier other than a manufacturer of the controlled system In another embodiment according to any of the previous embodiments, if a fault is detected on one of the attached modular component, a control algorithm is updated to report to all other attached modular components on a reconfiguration that does not rely upon the fault detected attached modular component.

In another embodiment according to any of the previous embodiments, at least one of the attached modular components is manufactured by a supplier other than a manufacturer of a controlled system.

In another featured embodiment, a method includes attaching a plurality of attached modular components to an embedded processing system. The attached modular components are each provided with a nameplate including at least part and serial number data. The embedded processing system receives the nameplate information from each of the attached modular components and compares the received nameplate information with stored nameplate information for the particular attached component, communicating with the attached modular component if the received nameplate information matches the stored nameplate information and identifying a fault if the received nameplate information conflicts with the stored nameplate information.

In another embodiment according to any of the previous embodiments, the nameplate information is encrypted.

In another embodiment according to any of the previous embodiments, the attached modular components include modules within the embedded processing system communicating outwardly to effectors on a controlled system, and receives sensed values from sensors associated with the controlled system.

In another embodiment according to any of the previous embodiments, the attached components also include nodes being control systems for auxiliary devices on the controlled system, and the nodes communicating into the embedded processing system, but are located outwardly of the embedded processing system.

In another embodiment according to any of the previous embodiments, at least one of the attached is manufactured by a supplier other than a manufacturer of the controlled system.

In another embodiment according to any of the previous embodiments, if a fault is detected on one of the attached modular component, a control algorithm is updated to report to all other attached modular components on a reconfiguration that does not rely upon the fault detected attached component.

In another embodiment according to any of the previous embodiments, at least one of the attached modular components is manufactured by a supplier other than a manufacturer of a controlled system.

In another featured embodiment, an assembly includes a plurality of effectors and sensors and an embedded processing system. The embedded processing system has processing circuitry, a memory system and a plurality of attached modular components. The attached modular components are each provided with an encrypted nameplate including at least part and serial number data. The processing circuitry is operable to receive the nameplate information from each of the attached modular components and compare the received nameplate information with stored nameplate information for the particular attached modular component. The processing circuitry is operable to communicate with the attached modular component if the received nameplate information matches the stored nameplate information and identify a fault if the received nameplate information conflicts with the stored nameplate information.

In another embodiment according to any of the previous embodiments, the attached modular components include modules within the embedded processing system communicating outwardly to the effectors, and receiving sensed values from the sensors.

In another embodiment according to any of the previous embodiments, the attached components include nodes being control systems for auxiliary devices on a controlled system, and the nodes communicate into the embedded processing system, but are located outwardly of the embedded processing system.

In another embodiment according to any of the previous embodiments, at least one of the attached modular components is manufactured by a supplier other than a manufacturer of the controlled system.

In another embodiment according to any of the previous embodiments, if a fault is detected on one of the attached modular component, a control algorithm is updated to report to all other the attached modular components on a reconfiguration that does not rely upon the fault detected attached modular component.

In another embodiment according to any of the previous embodiments, the assembly is an aircraft and the embedded processing system controls a gas turbine engine for the aircraft.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 4 shows a nameplate storage system.

FIG. 5 is a flowchart of an overall authentication system.

DETAILED DESCRIPTION

Figure 1A:
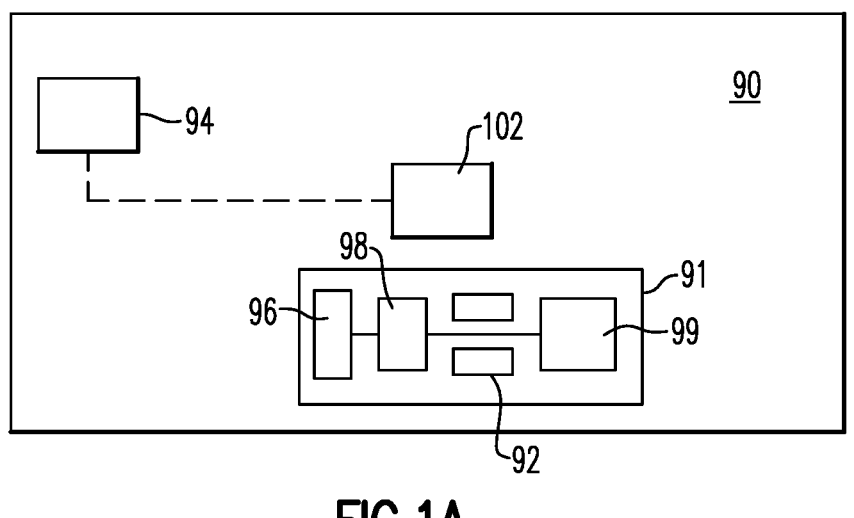
FIG. 1A schematically shows a gas turbine engine on an aircraft.

FIG. 1A schematically shows an assembly 90. In a disclosed embodiment assembly 90 may be an aircraft. A gas turbine engine 91 is shown as associated with the aircraft 90. Gas turbine engine 91 has a fan 96, a compressor section 98, a combustor section 97 and a turbine section 99. It should be understood that this is a highly schematic description. While a gas turbine engine and aircraft are disclosed as the assemblies and the associated control, other assemblies and controls may benefit from this disclosure.

As shown, an embedded processing system 102 communicates with a control 94 on the aircraft 90. The embedded processing system 102 may be a full authority digital electronic controller or FADEC for engine 91.

Figure 1B:
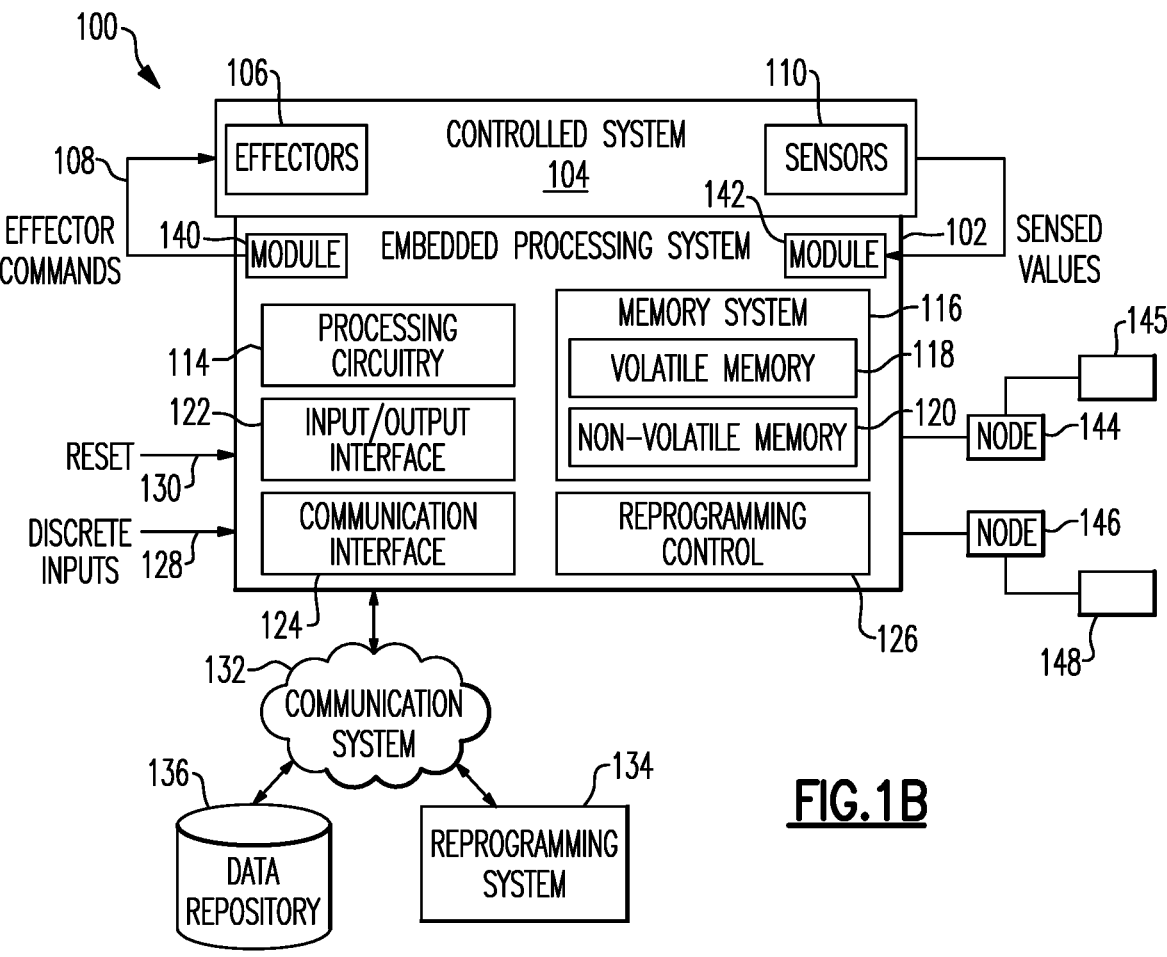
FIG. 1B is a block diagram of a control system.

FIG. 1B shows details of a system 100 including the embedded processing system 102 and the controlled system 104. Here, the controlled system 104 may include systems on the gas turbine engine of FIG. 1A.

The FIG. 1B system includes the embedded processing system 102 and a controlled system. The controlled system 104 can be any type of physical system that includes one or more effectors 106 controlled by one or more effector commands 108. The effector commands 108 are received from a module 140 associated with the embedded processing system 100.

Examples of effectors can include one or more motors, solenoids, valves, relays, pumps, heaters and/or other such actuation control components.

A plurality of sensors 110 can capture state data associated with the controlled system 104 and provide sensed values 112 as feedback to a module 142 in the embedded processing system 102 to enable closed-loop control of the controlled system 104 according to one or more control laws.

Examples of the sensors can include one or more temperature sensors, pressure sensors, strain gauges, level sensors, accelerometers, rate sensors, and the like.

While the controlled assembly is disclosed as a gas turbine engine, it can be other types of engines, a vehicle, a heating ventilating and air conditioning ("HVAC") system, an elevator system, industrial machinery, or the like.

For purposes of explanation, embodiments are primarily described with respect to a gas turbine engine system for an aircraft 90 as the controlled system, and in particular, the gas turbine engine 91.

In the FIG. 1B example, the embedded processing system 102 includes processing circuitry 114 and a memory system 116 configured to store a plurality of configuration items, where at least one of the configuration items includes a sequence of computer executable instructions for execution by the processing circuitry 114. Types of configuration items can include data, such as constants, configurable data, and/or fault data. Examples of computer executable instructions can include software, operating system software, and/or application software. The executable instructions can be stored or organized in any manner and at any level of abstraction, such as in connection with controlling and/or monitoring operation of the controlled system 104. The processing circuitry can be any type or combination of central processing unit ("CPU"), including one or more of: a microprocessor, a digital signal processor, a microcontroller, an application specific integrated circuit, a field programmable gate array, or the like.

In embodiments, the memory system may include volatile memory 118 such as random access memory, and nonvolatile memory 120, such as flash memory, read only memory, and/or other electronic, optical, magnetic, or any other computer readable medium onto which is stored data and algorithms in a non-transitory form.

The embedded processing system 102 can also include one or more of an input/output interface 122, a communication interface 124, a reprogramming control 126, and/or other elements.

The input/output interface 122 can include support circuitry for interfacing with the effectors 106 and sensors 110, such as filters, amplifiers, digital-to-analog converters, analog-to-digital converters, and other such circuits to support digital and/or analog interfaces. Further, the input/output interface 122 can receive or output signals to/from other sources. As one example, discrete inputs 128 can be input to the input/output interface to establish an operating mode of the embedded processing system 102, or to trigger actions by the embedded processing system 102.

A reset signal 130 may also be internally induced as a result of a loss of power detected by power conditioning circuitry, and by specific hardware or software direction. The communication interface 124 can be coupled to a communication system 132, which can include one or more direct or network communication links to systems such as a reprogramming system 134, a data repository 136, or another system. The communication system 132 may also communicate with the control 94 on the associated aircraft 90.

The reprogramming system 134 can be any type of computer system operable to load new/updated configuration items to the embedded processing system 102 for storage in the memory system 116. The reprogramming system 134 can interface to the communication system 132 to a wired, wireless, optical, or magnetic coupling. The data repository 136 can serve as a data source for updating the memory system 116, for instance, with control system data, or as a data sync to offload and clear data from the memory systems, such as fault data, history data, and the like.

As also shown, systems 145 and 148 may have control nodes 144 and 146 that communicate to the embedded processing system 102. As an example, the system 145 may be an anti-ice system.

Other examples of modules or nodes may include additional wired or wireless communication interfaces or input/output devices that are remote to optimize environmental considerations such as envelope, weight, thermal, and/or power.

In general, a module is a control system that is within the embedded processing system 102, whereas a node is outside the system 102, but communicating with it. Modular processing systems must be able to be updated to have modules and/or nodes replaced from time to time, and it would be desirable to be able to ensure the propriety and integrity of the replaced modules and controls. That is, detect any counterfeits or incorrect modules/nodes. In addition, it would be desirable to identify a fault with any of the modules and/or nodes.

Figure 2:
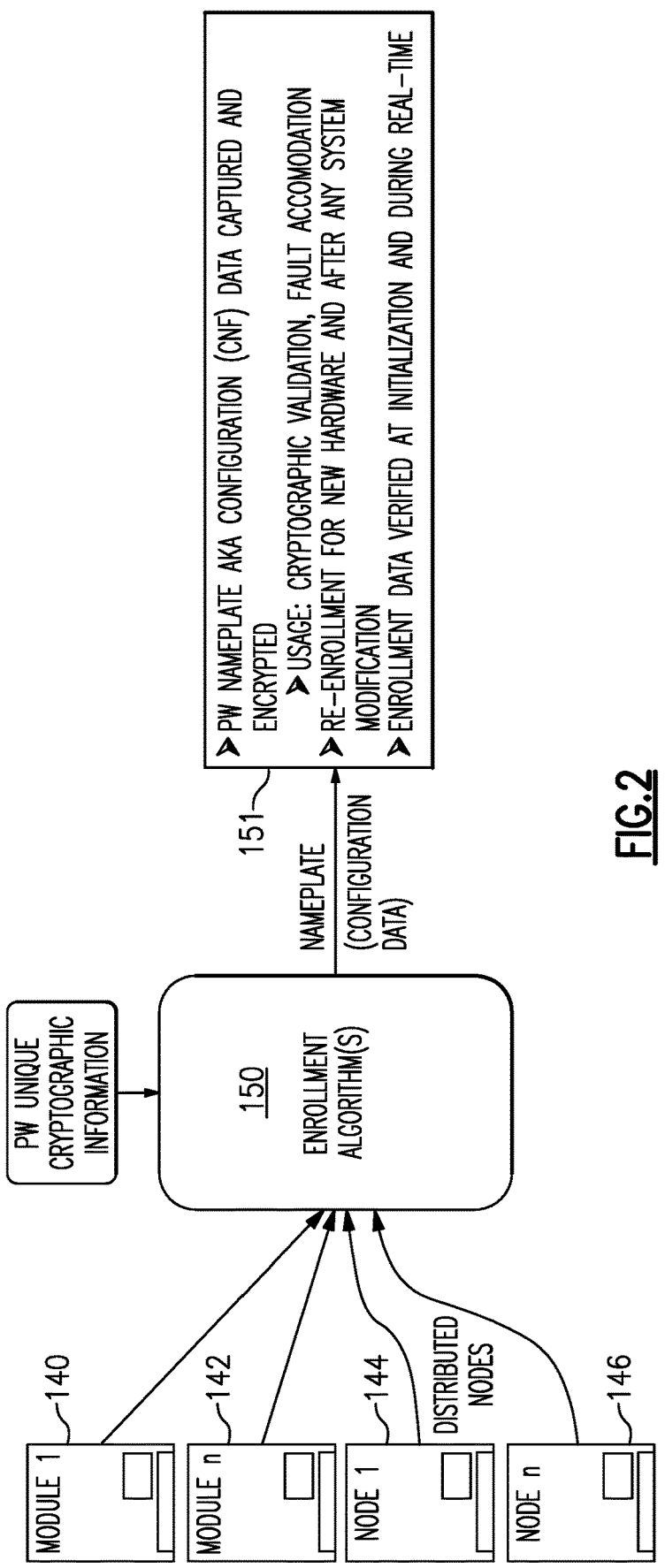
FIG. 2 shows an enrollment step for modules and/or nodes.

As shown in FIG. 2, in an enrollment process, during production modules 140-142 and nodes 144-146 are provided with an enrollment algorithm including unique cryptographic information provided to a supplier of the module and/or node from the manufacturer of the embedded processing system 102, the control system 104, or the vehicle 90. Thus, each of the modules and nodes (collectively "connected components") has a "nameplate," or configuration data captured and encrypted. Such data desirably contains part and serial number data, and is digitally signed, and optionally encrypted.

Figure 3A:
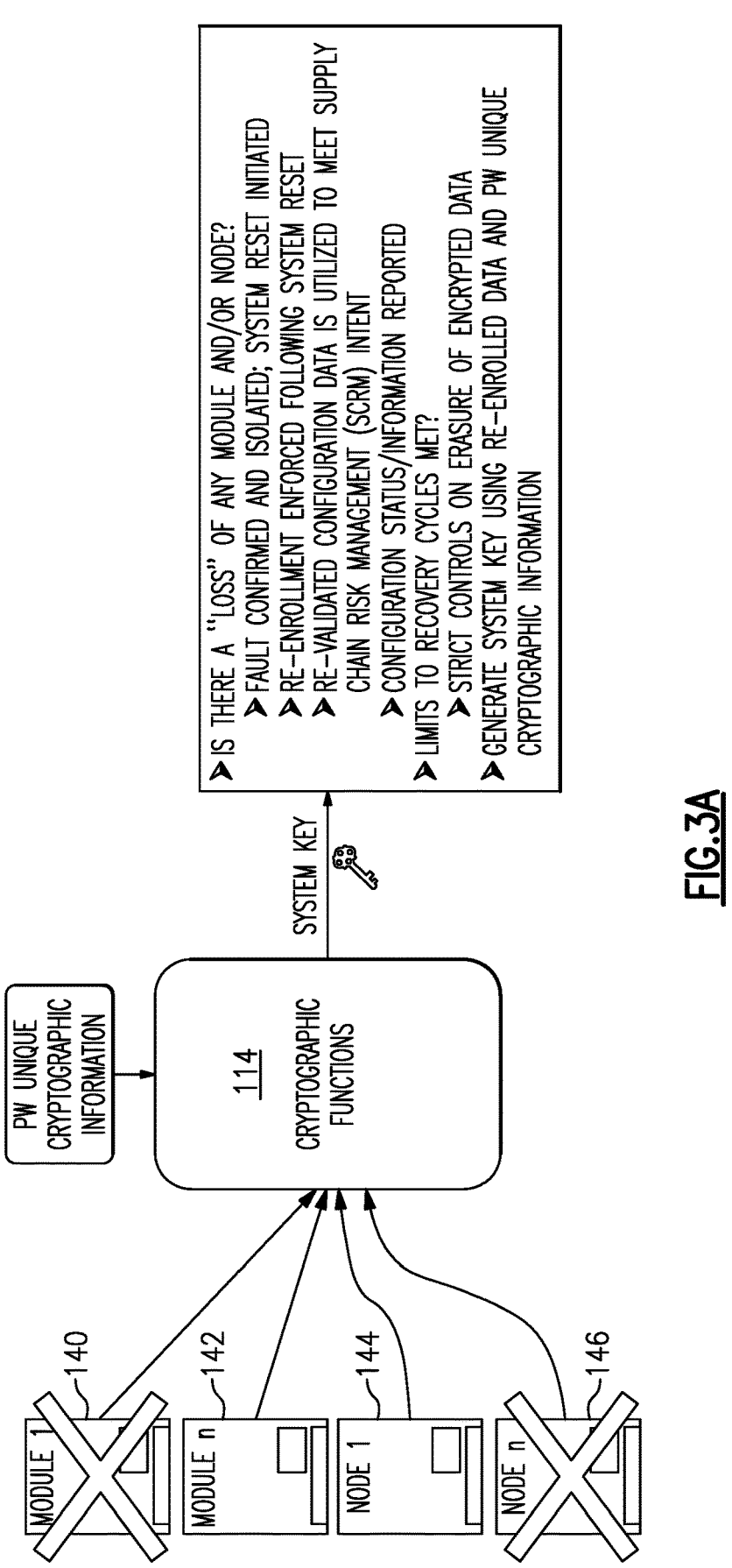
FIG. 3A shows an occurrence wherein there is a failure or a fault detection.

As shown in FIG. 3A, the processing circuitry 114 receives the nameplate information from each of the modules and nodes. If any module or node fails authentication, or does not provide appropriate information, a fault detection process is entered.

Figure 3B:
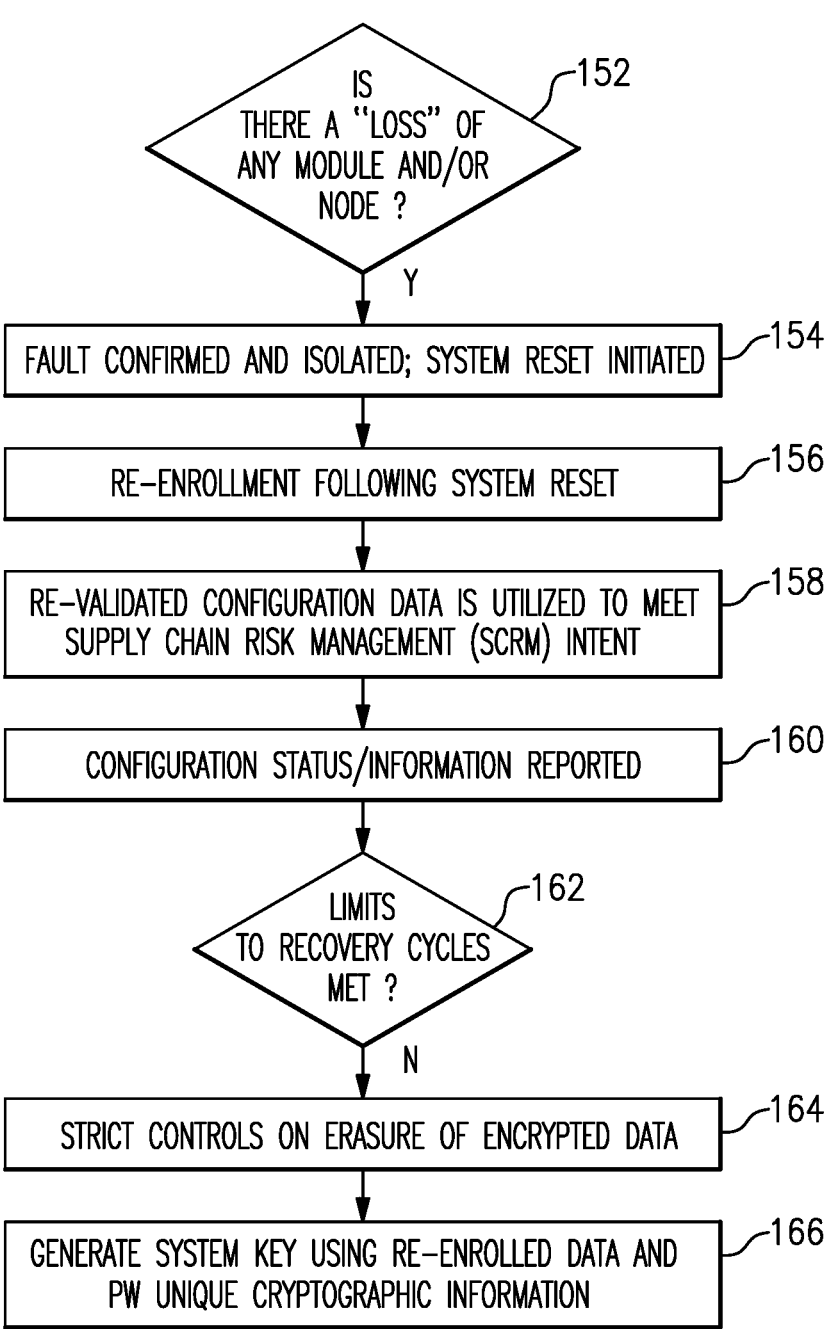
FIG. 3B is a flowchart showing the response to a detected fault.

Thus, as shown in FIG. 3B, at step 152 the system asks if there is a loss of any nodule and/or node. If so, a fault is confirmed and isolated and a system reset initiated at step 154. At step 156, all of the nodes and modules must be re-enrolled after the system reset, such as authenticating their nameplate information again.

At step 158, revalidated configuration data is utilized to meet supply chain risk management intent.

Supply chain risk management is utilized to identify against counterfeit module and/or node insert. Further, it is utilized to protect against physical tamper attacks. In step 160, configuration status/information is reported.

As an example, in step 162, there may be a limit to the number of recovery recycles.

Strict controls are utilized on the erasure of any encrypted data at step 164.

If the faulted module and/or node does not come back on line within the limit of recovery cycles, then the processing circuitry 114 is provided with new information as to the current operating state or the controlled system 104 and embedded processing system 102. As an example, if the fault occurs during a flight of the associated aircraft, the flight must be completed. Thus, by updating the processing circuitry to accommodate the controls to best affect operation without the faulted attached components the aircraft can still fly.

In step 166, a system key is generated using re-enrollment data and "owner" unique cryptographic information.

Each attached component updates its ledger to include the current configuration block.

FIG. 4 shows a plurality of nameplates 151A, 151B, and 151C for the modules and nodes. Such are encrypted at first step 170 and the encrypted nameplate is encrypted at a second step 171. The double encrypted information is stored in the non-volatile memory 120. This re-enrollment data is solely utilized for accommodation, step 156, in the event of a module/node loss of communication failure.

A flowchart for overall operation of the system is shown in FIG. 5. At step 172, the embedded processing system 102 receives the nameplate, or configuration data from each attached component at initialization or in real-time.

At step 174, each nameplate is authenticated to ensure appropriate configuration data.

At step 176, the system asks if the data matches the stored configuration nameplate information. If not, then the particular attached component is identified as a faulted component at step 178. The system may then reconfigure as explained with regard to FIG. 3B.

If step 176 is answered in the affirmative, the flowchart moves to step 180. After 178, the flowchart also returns to step 180. At 180, the configuration data is reported to a supply chain risk management system. As an example, this could be the control 94 on the associated aircraft 90.

At 182, the system generates cryptographic system keys with owner unique cryptographic information.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An embedded processing system comprising:
   processing circuitry;
   a memory system;
   a plurality of attached modular components, the attached modular components each being provided with a nameplate including at least part and serial number data;
   the processing circuitry being operable to receive the nameplate information from each of the attached modular components and compare the received nameplate information with stored nameplate information for the particular attached modular component
   the processing circuitry being operable to communicate with the attached modular component if the received nameplate information matches the stored nameplate information and identify a fault if the received nameplate information conflicts with the stored nameplate information; and
   wherein if a fault is detected on one of said attached modular component, a control algorithm is updated to report to all other attached modular components on a reconfiguration that does not rely upon the fault detected attached modular component.

2. The system as set forth in claim 1, wherein the nameplate information is encrypted.

3. The system as set forth in claim 2, wherein the attached modular components include modules within the embedded processing system communicating outwardly to effectors on a controlled system, and receiving sensed values from sensors associated with the controlled system.

4. The system as set forth in claim 3, wherein the attached components also include nodes being control systems for auxiliary devices on the controlled system, and the nodes communicating into the embedded processing system, but being located outwardly of the embedded processing system.

5. The system as set forth in claim 3, wherein at least one of the attached modular components is manufactured by a supplier other than a manufacturer of the controlled system.

6. The system as set forth in claim 1, wherein at least one of the attached modular components is manufactured by a supplier other than a manufacturer of a controlled system.

7. The system as set forth in claim 1, wherein once a fault is identified, the processing circuitry is operable to receive the nameplate information from each of the plurality of attached modular components again, and compare the received nameplate information with stored nameplate information for the particular attached modular component, and if a fault is again identified, repeating these steps for a predetermined number of times, with the control algorithm not being updated to report to all of the other of plurality of attached modular component until the fault has been identified for the predetermined number of times.

8. A method comprising:
   attaching a plurality of attached modular components to an embedded processing system, the attached modular components each being provided with a nameplate including at least part and serial number data;
   the embedded processing system receiving the nameplate information from each of the attached modular components and comparing the received nameplate information with stored nameplate information for the particular attached component;
   communicating with the attached modular component if the received nameplate information matches the stored nameplate information and identifying a fault if the received nameplate information conflicts with the stored nameplate information; and
   wherein if a fault is detected on one of said attached modular component, a control algorithm is updated to report to all other attached modular components on a reconfiguration that does not rely upon the fault detected attached component.

9. The method as set forth in claim 8, wherein the nameplate information is encrypted.

10. The method as set forth in claim 9, wherein the attached modular components include modules within the embedded processing system communicating outwardly to effectors on a controlled system, and receiving sensed values from sensors associated with the controlled system.

11. The method as set forth in claim 10, wherein the attached components also include nodes being control systems for auxiliary devices on the controlled system, and the nodes communicating into the embedded processing system, but being located outwardly of the embedded processing system.

12. The method as set forth in claim 10, wherein at least one of the attached is manufactured by a supplier other than a manufacturer of the controlled system.

13. The method as set forth in claim 8, wherein at least one of the attached modular components is manufactured by a supplier other than a manufacturer of a controlled system.

14. The method as set forth in claim 8, wherein once a fault is identified, the processing circuitry is operable to receive the nameplate information from each of the plurality of attached modular components again, and compare the received nameplate information with stored nameplate information for the particular attached modular component, and if a fault is again identified, repeating these steps for a predetermined number of times, with the control algorithm not being updated to report to all of the other of plurality of attached modular component until the fault has been identified for the predetermined number of times.

15. An assembly comprising:
   a plurality of effectors and sensors and an embedded processing system;
   the embedded processing system having:
      processing circuitry;
      a memory system;
      a plurality of attached modular components, the attached modular components each being provided with an encrypted nameplate including at least part and serial number data;
      the processing circuitry being operable to receive the nameplate information from each of the attached modular components and compare the received nameplate information with stored nameplate information for the particular attached modular component;
      the processing circuitry being operable to communicate with the attached modular component if the received nameplate information matches the stored nameplate information and identify a fault if the received nameplate information conflicts with the stored nameplate information; and
      wherein if a fault is detected on one of said attached modular component, a control algorithm is updated to report to all other said attached modular components on a reconfiguration that does not rely upon the fault detected attached modular component.

16. The assembly as set forth in claim 15, wherein the attached modular components include modules within the embedded processing system communicating outwardly to the effectors, and receiving sensed values from the sensors.

17. The assembly as set forth in claim 16, wherein the attached components include nodes being control systems for auxiliary devices on a controlled system, and the nodes communicating into the embedded processing system, but being located outwardly of the embedded processing system.

18. The assembly as set forth in claim 15, wherein at least one of the attached modular components is manufactured by a supplier other than a manufacturer of the controlled system.

19. The assembly set forth in claim 15, wherein the assembly is an aircraft and the embedded processing system controls a gas turbine engine for the aircraft.

20. The assembly as set forth in claim 15, wherein once a fault is identified, the processing circuitry is operable to receive the nameplate information from each of the plurality of attached modular components again, and compare the received nameplate information with stored nameplate information for the particular attached modular component, and if a fault is again identified, repeating these steps for a predetermined number of times, with the control algorithm not being updated to report to all of the other of plurality of attached modular component until the fault has been identified for the predetermined number of times.

* * * * *